Figure 1:
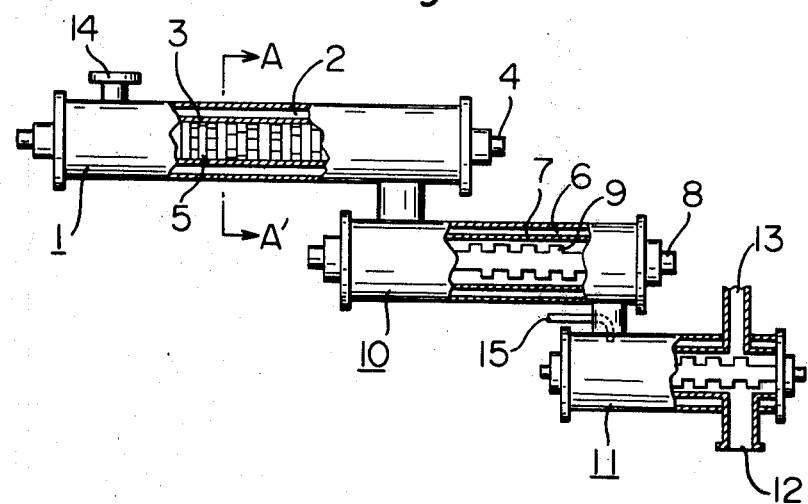

United States Patent [19]

Sugio et al.

[11] 4,339,569

[45] Jul. 13, 1982

[54] PROCESS FOR CONTINUOUS PRODUCTION OF OXYMETHYLENE POLYMER OR COPOLYMER

[75] Inventors: Akitoshi Sugio, Ohmiya; Akira Amemiya, Tokyo; Tadashi Kunii, Yokkaichi; Tomotaka Furusawa, Matsudo; Mutsuhiko Takeda, Matsudo; Katsumasa Tanaka, Yokkaichi; Toshikazu Umemura, Tokyo, all of Japan

[73] Assignee: Mitsubishi Gas Chemical Co., Inc., Tokyo, Japan

[21] Appl. No.: 150,986

[22] Filed: May 19, 1980

[30] Foreign Application Priority Data

May 18, 1979 [JP] Japan .................................. 54/61106

[51] Int. Cl.³ .............................................. C08G 2/10
[52] U.S. Cl. .................................... 528/240; 528/241; 528/242
[58] Field of Search ........................ 528/240, 241, 242

[56] References Cited

U.S. PATENT DOCUMENTS 4,087,411   5/1978   Sugio et al. ...................... 525/411 X
4,115,369   9/1978   Sugio et al. ........................... 526/65

Primary Examiner—Lucille M. Phynes
Attorney, Agent, or Firm—Wenderoth, Lind & Ponack

[57] ABSTRACT

In a process for producing an oxymethylene homopolymer or copolymer having improved stability which comprises polymerizing trioxane or a mixture of trioxane and a cyclic ether and/or a cyclic acetal in bulk in the presence of a catalyst which is at least one compound selected from the group consisting of boron trifluoride, boron trifluoride hydrate and coordination compounds of boron trifluoride with organic compounds containing an oxygen or sulfur atom, the improvement which comprises performing the bulk polymerization without destroying the bulk polymerization system, or which comprises adding a tertiary phosphine compound to the polymerization system to deactivate the catalyst, before the polymerization system formed by the bulk polymerization is destroyed.

9 Claims, 2 Drawing Figures

PROCESS FOR CONTINUOUS PRODUCTION OF OXYMETHYLENE POLYMER OR COPOLYMER

This invention relates to a process for producing an oxymethylene homopolymer or copolymer, and more specifically, to a process for producing an oxymethylene homopolymer or copolymer having improved stability suitable for handling the polymer in a subsequent stabilizing treatment, particularly improved heat stability.

It is known to obtain an oxymethylene homopolymer or copolymer by polymerizing trioxane or copolymerizing trioxane with a cyclic ether and/or a cyclic acetal, and various polymerization apparatuses and methods for use in this process have been known.

A method comprising continuously polymerizing a monomer containing at least 50% by weight of trioxane in bulk without substantially using a solvent, which is among these known methods, is attracting particular attention as being commercially advantageous because in addition to the availability of a lately developed apparatus equipped with means for removing the heat of polymerization and means for imparting a sufficient shearing action to the polymerization product, this method does not require a solvent recovery procedure and gives a high-molecular-weight polymer in high yields (see U.S. Pat. No. 4,115,369).

In such a prior art method of continuous bulk polymerization, it is usual practice to use a polymerization apparatus having a vent for discharge of gases generated in the polymerization reaction system, continuously withdraw a solid polymerization product from a polymer withdrawal opening while discharging from the vent gases generated during the polymerization, such as formaldehyde gas, the unreacted trioxane and comonomer gases or a gas resulting from a solvent optionally used, and thereafter to add a polymerization stopper to the polymerization product to terminate the polymerization by deactivating the polymerization catalyst or wash the polymerization product with a solution containing such a stopper. Undesirable phenomena, however, are often observed in such a vent-equipped apparatus. For example, a minor amount of catalyst contained in the waste gases may cause polymerization of formaldehyde or trioxane similarly contained in the waste gases in a gas vent line to form scales in the gas vent line. Or moisture in the air may come into the polymerization system through the open end of the gas vent line to increase the moisture content in the reaction apparatus and consequently to reduce the molecular weight of the resulting polymer. Furthermore, since the polymerization is carried out usually at 0° to 150° C., preferably 50° to 120° C., trioxane and the copolymer are partly volatilized to reduce the yield of the final polymer.

In order to prevent the incoming of moisture in the air into the polymerization apparatus equipped with a vent, the present inventors attempted to blow a large amount of a dry inert gas into the apparatus through the vent. They found however that this all the more accelerated the volatilization of the monomer, and resulted in a further decrease in the yield of the polymer. An attempt was also made to provide a packed tower filled with a desiccant such as molecular sieves in a gas discharge line leading to the vent, but it was found that scales deposited on the inside of the packed tower and blockage of the gas discharge line occurred more frequently.

The polymerization product withdrawn from a mixer of the continuously stirred type is usually stored first in a hopper or the like, and after it is optionally treated by, for example, pulverization, a polymerization stopper was added to the product to deactivate the catalyst. However, depolymerization of the polymerization product proceeds before the polymerization stopper is added. The polymer which has undergone depolymerization in the air has poor heat stability even if the catalyst is deactivated thereafter.

Consequently, it has been the previous practice to pour the polymer obtained by the polymerization immediately into a large amount of water or a solution containing a polymerization stopper such as an amine compound. This practice, however, requires the separation of the desired polymer from the water or solution or the recovery of solvent, and reduces the advantage of bulk polymerization. Accordingly, such a method of catalyst deactivation is undesirable for the commercial production of oxymethylene polymers by bulk polymerization.

It is an object of this invention therefore to provide a process for producing an oxymethylene homopolymer or copolymer having improved stability suitable for handling the polymer in a subsequent stabilizing treatment. In the following description: "improved stability" or "improved heat stability" has the same meaning.

Another object of this invention is to provide a commercially advantageous process of continuous bulk polymerization for the production of an oxymethylene homopolymer or copolymer having improved heat stability.

Still another object of this invention is to provide a bulk polymerization process for production of an oxymethylene homopolymer or copolymer having improved heat stability in high yields on monomer basis.

A further object of this invention is to provide a commercially advantageous process for continuous bulk polymerization, which involves adding a tertiary phosphine compound for catalyst deactivation to the bulk polymerization product in a continuously stirred mixer to permit production of an oxymethylene homopolymer or copolymer having improved heat stability and effective recovery of the unreacted monomer and formaldehyde generated in the polymerization system.

Other objects and advantages of this invention will become apparent from the following description.

In accordance with this invention, these objects and advantages are achieved by a process for producing an oxymethylene homopolymer or copolymer which comprises polymerizing trioxane or a mixture of trioxane and a cyclic ether and/or a cyclic acetal in bulk in the presence of a catalyst which is at least one compound selected from the group consisting of boron trifluoride, boron trifluoride hydrate and coordination compounds of boron trifluoride with organic compounds containing an oxygen or sulfur atom; characterized in that the bulk polymerization is carried out without destroying the bulk polymerization system; or that a tertiary phosphine compound is added to the polymerization system formed as a result of the bulk polymerization to deactivate the catalyst before the polymerization system is destroyed.

The critical feature of the process of this invention is that in polymerizing a monomer in bulk, the polymerization is carried out without destroying the polymerization system, or that before the polymerization system formed by the bulk polymerization of a monomer is destroyed, a tertiary phosphine compound is added to the polymerization system to deactivate the catalyst.

The expression "to destroy the polymerization system", as used in the present application, refers to the destruction of the "polymerization system formed by bulk polymerization which consists of a solid phase of the polymerization product and a gaseous phase containing formaldehyde and the unreacted monomer", and may be understood as meaning that the solid phase and the gaseous phase are partly or wholly withdrawn or discharged out of the polymerization system, or that materials not required in the desired polymerization reaction, such as water, come into polymerization system from outside the polymerization system.

The process of this invention, therefore, is carried out without withdrawing or discharging the solid phase or the gaseous phase from the polymerization system or without permitting incoming of water, etc. into the polymerization system from outside, and preferably by adding a tertiary phosphine compound to the polymerization system before the polymerization system is exposed to the atmosphere outside the polymerization system and withdrawing the polymerization product from the polymerization system after the catalyst has been deactivated by the treating phosphine compound added. In other words, the critical feature of the present invention is that the polymerization system is maintained closed throughout the entire period from the feeding of the starting materials to the deactivation of the catalyst after completion of the polymerization.

The process of this invention is described in detail below with reference to specific embodiments.

First, a starting mixture consisting of trioxane or a mixture of trioxane and a cyclic ether and/or a cyclic acetal and the boron trifluoride-type catalyst is fed into a mixer of the continuously stirred type.

A preferred type of the mixer includes a material feed opening, a polymer discharge opening and a tertiary phosphine feed opening provided between these openings with no portion opened into the atmosphere between the material feed opening and the tertiary phosphine feed opening. A plurality of such mixers may be used in a series-connected state if the material feed opening, the polymer discharge opening, the tertiary phosphine feed opening and other portions opened into the atmosphere in each of them are in the aforesaid relative positions.

The process of this invention is carried out by feeding trioxane or a mixture of trioxane and a cyclic ether and/or a cyclic acetal, polymerizing the charge in bulk, adding a tertiary phosphine compound through the tertiary phosphine feed opening to deactivate the catalyst, and withdrawing oxymethylene homopolymer or copolymer having improved heat stability from the polymer discharge opening.

Preferably, a reaction apparatus including a plurality of mixers of the continuously stirred type connected in series is used in the process of this invention. In a preferred embodiment of this structure, a mixer located rearmost is equipped with a polymer extrusion opening and an opening for discharging a waste gas containing trioxane and formaldehyde and a mixer located foremost has an opening for feeding starting materials, and an opening through which to add a triphosphine compound is provided either in the rearmost mixer or in a connecting part between it and an immediately preceding mixer. A mixer as a polymerization reactor which is located upstream of the polymerization stopper mixer is either a closed-type mixer having an opening for feeding starting materials with no other portion opened into the atmosphere or a closed-type mixer located downstream of the first-stage polymerization reactor as above-mentioned closed-type mixer and having no material feed opening nor any other opening opened into the atmosphere.

Desirably, the waste gas discharge opening is provided near the polymer withdrawing opening, and the product is continuously withdrawn while the inside of the mixer is filled with the polymer powder by providing a damper plate for holding up the polymer powder upstream of the gas discharge opening or by securing return blades or return screws to the stirring shafts of the mixer. Alternatively, the product may be withdrawn while the inside of the mixer is filled with the polymer powder by adjusting the rotating speed of the stirring shaft of the polymerization stopper mixer.

By taking such a procedure, the polymerization system is shielded from the outer atmosphere by the polymer powder containing the polymerization stopper added thereto. Hence, there is no incoming of moisture in the air into the polymerization system through the gas discharge line, and the polymerization system (the inside of the polymerization reactor) can be maintained substantially anhydrous and moreover, no volatilization of monomers occurs. Consequently, a polymer having improved heat stability can be obtained in a high yield.

The mixer of the continuously stirred type used as a polymerization reactor in the process of this invention may, for example, be a mixer, marketed under the tradename "Ko-Kneader", which comprises a cylindrical barrel as a reaction zone and a screw disposed within, and coaxially with, the barrel and having a number of ridges that interrupt the screw thread and which operates such that the interrupted portions mesh with teeth projecting from the inside surface of the barrel; an ordinary screw extruder comprising a long casing having a heating or cooling jacket on its outer wall and a pair of intermeshing parallel screws disposed within the casing; and a self-cleaning type mixer which comprises a long casing having a heating or cooling jacket on its outer wall and at least two horizontal stirring shafts disposed within the casing, each of said stirring shafts having a number of fixed paddles such as elliptical or quasitriangular paddles with at least one cross section thereof taken a right angles to the shaft having a plurality of line symmetries with respect to the axial center, and which operates such that when the shafts are rotated simultaneously in the same direction, they retain a slight clearance between the surfaces of the paddles of one shaft and those of the other and also between the paddles and the inside wall of the casing.

If only one such reactor is used, it is difficult to obtain a fine powdery polymer. Moreover, in order to achieve a high polymerization yield, a high torque or an increased L/D are required. In the process of this invention, therefore, it is desirable to use such a reactor as a first-stage polymerization reactor and another reactor directly connected to the first-stage reactor for second-stage polymerization, and to polymerize the starting monomer to a conversion of about 40 to about 90% in the first-stage reactor.

In one specific embodiment, the aforesaid self-cleaning type mixer is used as a first-stage polymerization reactor, and a horizontal mixer of the continuously stirred type having high heat-transmitting surfaces but having no scraping action between the individual surfaces of the inside of the reactor. A starting mixture containing at least 50% by weight of trioxane is continuously fed into the first-stage reactor, and polymerized while the mixture is being moved by the rotation of the paddles. When the conversion reaches about 40 to about 90%, the polymer mixture is directly fed into the second-stage reactor from the first-stage reactor. In the second-stage reactor, slow stirring and a sufficient residence time are imparted so that the product can be continuously withdrawn as a powdery polymer with a polymerization conversion of about 95 to about 100%.

In order to deactivate the catalyst and stop the polymerization, a tertiary phosphine compound is added in the process of this invention. Although it is possible to add this compound through a feed opening provided in the polymerization reactor in the later stage of the polymerization, it is preferred to connect a horizontal mixer of the continuously stirred type directly to the polymerization reactor in series and add the tertiary phosphine compound in the mixer and mix it with the polymer. This mixer is not particularly limited, and any mixer which has the function of mixing and transporting the powders continuously may be used. Since the critical feature of the present invention is that the polymerization system is maintained closed throughout the entire period from the feeding of the starting materials to the deactivation of the catalyst after completion of the polymerization, the opening for discharging a waste gas is of course provided on the side of the polymer discharging opening of the aforesaid mixer.

Desirably, the waste gas-discharging line for separation of the waste gas after the termination of the polymerization reaction is maintained at a temperature above the melting point of trioxane. Usually, it is maintained at a temperature of 70° to 100° C., and the waste gas is led to a water washing tower or a solvent-absorbing tower through this line. A cyclone may also be provided in the gas-discharging line in order to remove a minute polymer powder scattering in the gas-discharging line.

In performing the process of this invention, the reaction is carried out generally at 0° to 150° C., preferably 50° to 120° C., but the mixing of the polymerization stopper is effected at a temperature of −50° C. to 150° C., preferably 0° to 50°. In other words, cooling should be effected so that depolymerization may not take place before the completion of the reaction between the stopper and the polymerization catalyst. The rate of the stopping reaction is affected by the particle size of the polymer, the amount of the stopper, and when the stopper is to be dispersed in a solvent, by the concentration of the stopper in the dispersion. The amount of the stopper is 0.5 to 20 moles per mole of the polymerization catalyst used. In order to disperse the stopper favorably in the polymer, the stopper is desirably used as a solution in an inert organic solvent. Usually, it is used as a solution in a concentration of 0.01 to 1.5 millimoles per ml of the organic solvent.

In order to handle the oxymethylene homopolymer or copolymer properly in a subsequent heat stabilizing treatment the oxymethylene homopolymer or copolymer discharged from the polymerization stopper mixer is desirably pulverized to a fine particle size such that it wholly passes through a 10-mesh screen. Pulverization may be carried out by using various apparatuses such as a batchwise high-speed powder mixing device marketed under the tradename "Henschel Mixer", and devices adapted for continuous operation such as a jaw crusher, a rotary crusher, a hammer mill, a feather mill or a victory mill. Addition of the polymerization stopper obviates such an inconvenience as scalling even in such a pulverizing machine.

When the process of this invention is to be applied to the production of an oxymethylene copolymer, a compound of the following general formula (II) is used as a cyclic ether or cyclic acetal as a comonomer.

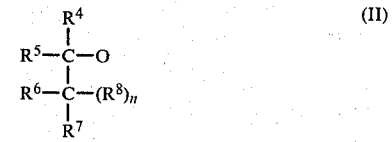

wherein $R^4$, $R^5$, $R^6$ and $R^7$ are identical or different and each represents a hydrogen atom, an alkyl group or a haloalkyl group, and $R^8$ represents a methylene or oxymethylene group or a methylene or oxymethylene group substituted by an alkyl or haloalkyl group in which case n is zero or an integer of 1 to 3, or a divalent group of the formula $-CH_2)_mOCH_2-$ or $-O-CH_2-CH_2)_mO-CH_2-$ in which n is equal to 1 and m is an integer of 1 to 4. The alkyl group in the above formula contains 1 to 5 carbon atoms and is optionally substituted by 1 to 3 halogen atoms, especially chlorine atoms.

Examples of suitable cyclic acetals or cyclic ethers are ethylene oxide, glycol formal and diglycol formal. Propylene oxide and epichlorohydrin can also be used. Cyclic formals of long-chain $\alpha,\omega$-diols, such as butanediol formal or hexanediol formal are also feasible.

The polymerization catalyst used in this invention is at least one compound selected from the group consisting of boron trifluoride, boron trifluoride hydrate and coordination compounds of boron trifluoride with organic compounds containing an oxygen or sulfur atom. It is used in gaseous form or as a solution in a suitable organic solvent. The coordination compounds of boron trifluoride, especially boron trifluoride etherate and boron trifluoride butylate, are preferred.

The polymerization stopper used in the process of this invention is a tertiary phosphine compound. The tertiary phosphine is a suitable polymerization stopper in the bulk polymerization process of this invention because it deactivates the catalyst present in the resulting polymer and a polymer having improved heat stability can be obtained without removing the catalyst so deactivated.

Such tertiary phosphine compounds are disclosed in U.S. Pat. No. 4,087,411, and therefore, the disclosure of this U.S. Patent is cited hereby as reference.

Preferred tertiary phosphine compounds used in the process of this invention are expressed by the following formula (I).

wherein $R^1$, $R^2$ and $R^3$ are identical or different and each represents a monovalent organic group having a carbon atom bonded to the phosphorus atom, and two of these groups $R^1$, $R^2$ and $R^3$ may be liked to each other to form a ring.

The monovalent organic group represented by $R^1$, $R^2$ and $R^3$ usually has 1 to 18 carbon atoms, and is preferably a substituted or unsubstituted alkyl group, a substituted or unsubstituted aryl group or a substituted or unsubstituted cycloalkyl group.

Examples of the tertiary phosphine compound include n-butyldimethyl phosphine, triethyl phosphine, dimethylphenyl phosphine, methylethyl-n-pentyl phosphine, diethylbutyl phosphine, tri-n-butyl phosphine, methyldiphenyl phosphine, ethyl-n-pentylphenyl phosphine, methylbenzylphenyl phosphine, ethyldiphenyl phosphine, ethyl-n-hexylphenyl phosphine, benzyl-n-butyl-n-propyl phosphine, ethyldicyclohexyl phosphine, isopropyldiphenyl phosphine, ethylbenzylphenyl phosphine, dibenzylethyl phosphine, n-butyldiphenyl phosphine, n-propylbenzylphenyl phosphine, n-butylbenzylphenyl phosphine, triphenyl phosphine, cyclohexyldiphenyl phosphine, dibenzyl-n-butyl phosphine, dicyclohexylphenyl phosphine, tricyclohexyl phosphine, diphenylbenzyl phosphine, dibenzylphenyl phosphine, tribenzyl phosphine, ethyltetramethylene phosphine, and ethylpentamethylene phosphine. Triphenyl phosphine is especially preferred for use in the process of this invention.

The polymer obtained by the process of this invention after addition of the tertiary phosphine compound and separation from the waste gas does not show a decrease in molecular weight owing to depolymerization even when allowed to stand in the air. An oxymethylene polymer, which is a homopolymer of trioxane, can be directly submitted to a terminal treatment such as acetylation. In the case of a copolymer of trioxane with a cyclic ether or cyclic acetal, a known heat stabilizer may be added, and the mixture is heated to 160° C. to 250° C., preferably to 180° to 230° C. to decompose and remove an unstable portion to give an acetal resin having superior heat stability.

The following Examples and Comparative Examples specifically illustrate the process of this invention.

EXAMPLE 1 AND COMPARATIVE EXAMPLE 1

A twin-screw extruder comprising a long casing having an external heating jacket and disposed therein a pair of parallel intermeshing screws having screw threads extending in the same direction and adapted for simultaneous rotation in the same direction was used as an apparatus for continuously polymerizing trioxane in bulk. The diameter D of each screw was 130 mm, and the length of its reaction part was 12D. The extruder had at its one end a nozzle opening for feeding trioxane and a polymerization catalyst, and an opening for discharging the reaction product at the other end. A mixer for a polymerization stopper comprising a casing having an inside diameter of 130 mm and a pair of shafts having feed and return screws disposed in the casing was directly connected to the product discharge opening. The polymerization stopper mixer included a nozzle opening for injection of the polymerization stopper at a joint part of connection with the polymerization apparatus, an opening for withdrawing a powder at the bottom of its other end, and a gas vent at its top portion.

The polymerization apparatus was continuously charged hourly with 10 kg of trioxane and 0.2 millimole, per mole of trioxane, of boron trifluoride diethyl etherate. Trioxane was polymerized while passing a heating medium kept at 80° C. through the jacket and adjusting the rotating speed of the screws to 10 rpm. A crude polymer in powder form was obtained from the discharge opening of the polymerization apparatus at a rate of 9.38 kg/hr. The powdery polymer was immediately sent to the polymerization stopper mixer, and a benzene solution containing 2 moles (per mole of the catalyst) of triphenyl phosphine in a concentration of 0.2 millimole per ml of benzene was added. The polymer discharged from the polymerization stopper mixer had an intrinsic viscosity (measured in p-chlorophenol containing 2% α-pinene at 60° C.; the measuring procedure is the same in the following examples) of 1.38 dl/g, and the crude polymer contained 12% of unreacted trioxane. In the meantime, a waste gas was recovered from the gas vent through a gas discharging line having a diameter of 50 mm and a length of 10 m. The gas discharge line was maintained at 60° C., and its end was connected to a washing tower. Trioxane and formaldehyde in the waste gas were recovered. After operating for 10 hours, 5 kg of trioxane and 1.2 kg of formaldehyde were recovered.

During the operation for 10 hours, no scaling was noted in the vicinity of the gas vent, the gas discharge line and the discharge opening of the polymerization stopper mixer. The polymer withdrawn was stored thereafter for 6 months at room temperature, but no decrease in molecular weight was noted.

For comparison, the polymerization was performed under the same conditions as above except that the polymerization stopper mixer was not used, and an opening for withdrawing the polymer was provided at the bottom of the end of the polymerization apparatus, and a gas vent was provided at its top portion. The polymer withdrawn was collected in a hopper, and every two hours, the polymer was transferred to a high-speed powder mixer (tradename, "Henschel mixer"), and 2 moles, per mole of the polymerization catalyst, of triphenyl phosphine was added as a benzene solution.

Moisture from the absorbing tower connected to the end of the gas discharge line of the polymerization apparatus came into the polymerization apparatus, and the resulting polymer had an intrinsic viscosity of 0.50 to 0.55 dl/g and was quite useless as a molding material. Accordingly, nitrogen gas was blown into the polymerization reactor at a rate of 20 liters/min. through the waste gas recovering opening, and the polymerization was performed while preventing incoming of the moisture. The polymer obtained after operating for 10 hours had an intrinsic viscosity of 1.29 dl/g and contained 7.5% of the unreacted monomer. But it gradually underwent depolymerization while it was stored in a hopper for 2 hours, and its intrinsic viscosity decreased to 1.15 to 1.20 dl/g.

During the 10-hour operation, heavy scaling occurred especially in the gas discharging line in the vicinity of the gas vent of the polymerization apparatus. As a result, the space in the line having a diameter of 50 mm and a length of about 1 m was narrowed to a diameter of about 20 mm.

EXAMPLE 2 AND COMPARATIVE EXAMPLE 2

Figure 2:
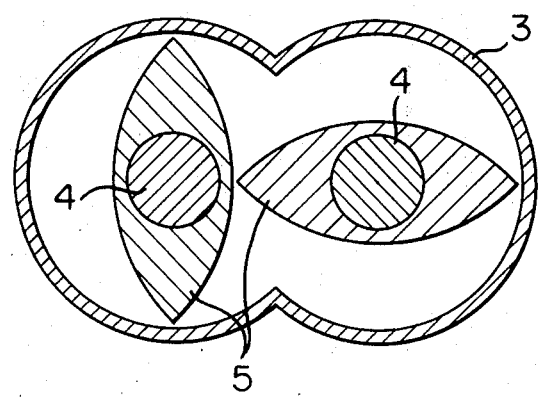

A first-stage polymerization reactor, a second-stage polymerization reactor and a polymerization stopper mixer were combined as shown in FIG. 1. Specifically, the first-stage polymerization reactor (1) was a mixer consisting of a long casing (3) having a jacket (2) fitted over its external wall and disposed therein a pair of shafts (4) each of which had secured thereto a number of intermeshing elliptical paddles (5) which operated such that when the shafts were rotated simultaneously in the same direction, the ends of the long axis portions of the paddles of one shaft rotated while always maintaining a slight clearance from the inner surface of the casing and the paddles of the other shaft (see FIG. 2). The second-stage polymerization reactor (10) was a pin mixer consisting of a long casing (7) having a jacket (6) fitted over its external wall and a shaft (8) disposed therein and having a number of pins (9) secured to the shaft (8) for mixing of powders. The second-stage polymerization reactor was directly connected to the first-stage polymerization reactor, and a pin mixer (11) of the same type as above was used as the polymerization stopper mixer and directly connected to the second-stage polymerization reactor. In the first-stage polymerization reactor, the inside diameter of the casing was 50 mm, and the distance between paddles and between a paddle and the inner surface of the casing was 0.5 mm on an average, and the thickness of each paddle was 10 mm. In the second-stage polymerization reactor and the polymerization stopper mixer, the inside diameter of the casing was 100 mm. A waste gas sucking port (13) was provided immediately above a product withdrawing opening (12) of the polymerization stopper mixer. A pipe kept at 70° C. and having a diameter of 25 mm and a length of 5 m was used as a gas discharge line, and its end was directly connected to a suction bottle containing water. The pressure of the inside of the suction bottle was slightly reduced, and a waste gas from the discharge line was conducted into the absorbing water.

The first-stage polymerization reactor was charged hourly through the material feed opening (14) with 2 kg of trioxane, 50 g of ethylene oxide and 0.18 millimole/per mole of trioxane, of boron trifluoride diethyl etherate. The polymerization temperture was adjusted to 80° C., and trioxane and ethylene oxide were copolymerized. A powdery copolymer containing about 40% of the unreacted matter was sent from the first-stage polymerization reactor to the second-stage polymerization reactor, where the powder was slowly mixed while maintaining the reaction temperature at 50° C. The powdery copolymer transferred to the polymerization stopper mixer contained less than 2% of the unreacted trioxane. A benzene solution containing 0.2 millimole of triphenylphosphine per milliliter of benzene was added to the copolymer in the stopper mixer through a feed opening (15) provided in the polymerization stopper mixer to stop the polymerization. The amount of the triphenyl phosphine added was 2 moles per mole of the boron trifluoride diethyl etherate used. During a continuous operation for about 300 hours, a copolymer having an intrinsic viscosity of 1.43 to 1.45 dl/g was obtained in a yield of 96.5 to 97.5%, as a resulst of measurement every 4 hours. The copolymer obtained was designated "sample A".

During the polymerization operation, no scaling was noted in the gas discharge line, and after the 300 hours' operation, 12 kg of trioxane and 2.9 kg of formaldehyde were recovered.

For comparison, the above procedure was repeated except that the polymerization stopper mixer was not used and instead a hopper was provided immediately below the second-stage polymerization reactor; a damper at the bottom of the hopper was opened every 2 hours to withdraw the resulting polymer; and the polymerization was stopped by adding triphenyl phosphine by means of a high-speed powder fluidizing mixer (tradename "Henschel Mixer"). A gas discharge line was similarly provided immediately above the polymer discharge port of the second-stage polymerization reactor, and to prevent inclusion of moisture, a packed tower filled with molecular sieve and having a diameter of 50 mm and a length of 50 cm was provided in the gas-discharge line.

During the polymerization operation for about 100 hours, the polymer had an intrinsic viscosity of 1.25 to 1.35 dl/g and the yield of the polymer was 9.25 to 93.5%, as determined every 2 hours. The slight decrease in intrinsic viscosity was due presumably to depolymerization of the product during 2-hour residence in the hopper. The polymer obtained was designated "sample B".

During the operation for about 100 hours, scaling was seen in the gas discharge line. Particularly, the vicinity of the suction port was clogged in about 20 hours after starting of the operation, and it was necessary to occasionally disassemble the connecting part leading to the gas discharge line for cleaning. Scaling was also seen in the inside of the molecular sieve-packed tower, and it had to be exchanged every about 10 hours.

One hundred parts by weight of each of samples A and B was mixed with 0.5 part by weight of an antioxidant (Irganox 259, a tradename), 0.2 parts by weight of polyvinyl pyrrolidone and 1 part by weight of calcium hydroxide. Each of the mixtures obtained was kneaded at 200° C. for 30 minutes by a Laboplastomill to stabilize it against heat.

The intrinsic viscosities of the stabilized copolymers, and the weight losses ($K^{222}$) of these polymers after heating in the air at 222° C. for 3, 5 and 8 hours respectively were measured, and the results are shown in Table 1.

TABLE 1

|  | Intrinsic viscosity (dl/g) | | Weight loss (%) in the air at 222° C. after | | |
|---|---|---|---|---|---|
|  | Crude copolymer | stabilized copolymer | 3 hours | 5 hours | 8 hours |
| Sample A | 1.45 | 1.46 | 1.0 | 2.8 | 6.5 |
| Sample B | 1.35 | 1.31 | 2.1 | 8.7 | 19.2 |

EXAMPLE 3

An apparatus comprising a first-stage polymerization reactor, a second-stage polymerization reactor and a polymerization stopper mixer was used. The first-stage polymerization reactor was a mixer consisting of a long casing, a jacket fitted over its external wall, and disposed therein, a pair of shafts each of which had a number of intermeshing quasitriangular paddles secured thereto and which were adapted to be operated such that when the two shafts were rotated simultaneously in the same direction, the paddles of one shaft always maintained a slight clearance from the inner surface of the casing and the paddles of the other shaft. The second-stage polymerization reactor was a horizontal mixer adapted for mixing and transportation of a powder which consisted of a casing, a jacket fitted over its external wall and disposed therein, a pair of shafts each of which had a feed screw and a recessed return screw for rotation in different directions. The first-stage polymerization reactor was directly connected to the second-stage polymerization reactor. The polymerization stopper mixer was a horizontal mixer adapted for mixing and transporting a powder, and directly connected to the second-stage polymerization reactor.

The polymerization stopper mixer consisted of a casing, a jacket fitted over its external wall and disposed therein a pair of shafts each of which had a return screw and a feed screw capable of rotating in different directions and further included a powder feed opening and a stopper feed opening at one end thereof, a powder discharge opening at the other end, and a gas vent above the powder discharge opening.

In the first-stage polymerization reactor, the inside diameter of the casing was 102 mm; the thickness of each paddle fixed to the shaft was 20 mm; and the clearance between paddles and between a paddle and the inner surface of the casing was 2 mm±1 mm. In the second-stage polymerization reactor, the inside diameter of the casing was 203 mm. The inside diameter of the casing in the polymerization stopper mixer was 102 mm.

The first-stage polymerization reactor was charged hourly through the material feed opening with 20 kg of trioxane, 700 g of 1,3-dioxepane and 0.20 millimole, per mole of trioxane, of boron trifluoride diethyl etherate. The polymerization temperature was adjusted to 90° C. in the first half of the first stage polymerization reactor, to 70° C. in the latter half of the first-stage polymerization reactor, and to 50° C. in the second-stage polymerization reactor. From the second-stage polymerization reactor a powdery polymer containing less than 1% of unreacted trioxane was taken out. The powder was in the finely divided state with 80% by weight of particles capable of passing through a 10-mesh screen. A polymerization stopper solution containing 0.5 millimole of triphenyl phosphine per mol of benzene was added at a rate of 90 ml per hour. In the polymerization stopper mixer, the polymer was cooled to room temperature while being mixed with the polymerization stopper, and then withdrawn from it. Immediately below the polymerization stopper mixer was provided a feather mill crusher having a knife for shearing and crushing a powder which rotated at a high velocity. The polymer powder was crushed by the feather mill crusher to such a particle size that all particles could pass through a 10-mesh screen. To a gas vent of the polymerization stopper mixer was fitted a gas discharge line having a diameter of 50 mm and kept at 70° C., and the waste gas was conducted to a washing tower through the gas discharge line. A cyclone for removing a fine powder of polymer was provided in the gas discharge line. During the 200-hour operation, a polymer having an intrinsic viscosity of 1.43 to 1.48 dl/g was obtained in a yield of 98.5 to 99.7%, and the operation could be performed stably. No scaling occurred in the gas discharge line and the inside of the crusher.

EXAMPLE 4

Trioxane (2 kg), 50 g of ethylene oxide and 0.15 millimole, per mole of trioxane, of boron trifluoride diethyl etherate were fed hourly into the same first-stage polymerization reactor as used in Example 2 while maintaining the reaction temperature at 80° C. A powdery copolymer containing about 35% of the unreacted monomers from the outlet of the first-stage polymerization reactor was sent to the second-stage polymerization reactor which was the same type of reactor as the first-stage polymerization reactor except that the combination of paddles was changed so as to allow a sufficient reaction time for completion of the polymerization and which was connected in series to the first-stage polymerization reactor. The reaction temperature was kept at 50° C. in the second-stage polymerization reactor, and then the copolymer containing less than 1.5% of unreacted trioxane was transferred to a polymerization stopper mixer directly connected to the second-stage polymerization reactor. A benzene solution containing 0.2 millimole of diphenyl cresyl phosphine per milliliter of benzene was also added hourly to the polymerization stopper mixer. The copolymer and the stopper solution were mixed up homogeneously. Then, the polymer powder was taken out from the mixer continuously, and crushed by a turbomill. A stabilizer was added and the unstable portion of the copolymer was decomposed at an elevated temperature. Finally, a heat-stable polyoxymethylene copolymer having an intrinsic viscosity of 1.40 to 1.43 dl/g was obtained.

No trouble such as scaling in the gas discharge line and the vicinity of the suction port was noted during continuous operation for about 150 hours.

What is claimed is:

1. In a process for producing an oxymethylene homopolymer or copolymer having improved stability which comprises polymerizing trioxane or a mixture of trioxane and a cyclic ether and/or a cyclic acetal in bulk in the presence of a catalyst which is at least one compound selected from the group consisting of boron trifluoride, boron trifluoride hydrate and coordination compounds of boron trifluoride with organic compounds containing an oxygen or sulfur atom, the improvement which comprises using as a reactor of the polymerization, a mixer system of the continuously stirred type which includes a material feed opening, a polymer discharge opening and a waste gas discharge opening near the polymer discharge opening with no portion opened into the atmosphere between the material feed opening and the polymer discharge opening except the waste gas discharge opening so that exposure of the bulk polymerization system to the atmosphere is prevented by maintaining the system closed throughout the entire polymerization process from the feeding of the starting reaction materials into the system to the discharging of the polymer after completion of the polymerization.

2. In a process for producing an oxymethylene homopolymer or copolymer having improved stability which comprises polymerizing trioxane or a mixture of trioxane and a cyclic ether and/or a cyclic acetal in bulk in the presence of a catalyst which is at least one compound selected from the group consisting of boron trifluoride, boron trifluoride hydrate and coordination compounds of boron trifluoride with organic compounds containing an oxygen or sulfur atom, the improvement which comprises using, as a reactor of the polymerization, a mixer system of the continuously stirred type which includes a material feed opening, a polymer discharge opening, a tertiary phosphine feed opening provided between these openings for deactivating the catalyst with a tertiary phosphine compound, and a waste gas discharge opening near the polymer discharge opening with no portion opened into the atmosphere between the material feed opening and the tertiary phosphine feed opening so that exposure of the bulk polymerization system to the atmosphere is prevented by maintaining the system closed throughout the entire polymerization process from the feeding of the starting reaction materials into the system to the deactivation of the catalyst after completion of the polymerization.

3. The process of claim 2 wherein said mixer system consists of at least two mixers of the continuously stirred type connected in series, and said tertiary phosphine compound is added in a mixer located rearmost or in a connecting part between the rearmost mixer and an immediately preceding mixer.

4. The process of claims 2 or 3 wherein said tertiary phosphine compound is a compound of the formula

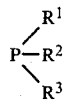

wherein $R^1$, $R^2$ and $R^3$ are identical or different and each represents a monovaent organic group having a carbon atom bonded to the phosphorus compound, and two of $R^1$, $R^2$ and $R^3$ may be linked to each other to form a ring.

5. The process of claim 4 wherein $R^1$, $R^2$ and $R^3$ each represent a substituted or unsubstituted alkyl group, a substituted or unsubstituted cycloalkyl group, or a substituted or unsubstituted aryl group.

6. The process of claim 3 wherein the polymerization is performed to a conversion of about 40 to about 90% in a mixer located foremost in the mixer system.

7. The process of claim 3 wherein said foremost mixer is a mixer of the continuously stirred type which comprises a barrel having a material feed opening and a connecting part for connection with the next mixer of the continuously stirred type and a jacket for a cooling or heating medium located externally of said barrel, and disposed therein, at least two horizontal stirring shafts, each of said stirring shafts having a number of fixed paddles with at least one cross section thereof taken at right angles to the shaft having a plurality of line symmetries with respect to the axial center, and which operates such that when the shafts are rotated simultaneously in the same direction, the tips of the paddles of one shaft always retain a slight clearance from the inner surface of the barrel and the surface of the paddles of the other shaft, and immediately rearward of said mixer is provided a horizontal mixer of the continuously stirred type which has high heat-transmitting surfaces but exhibits no scraping action between the individual surfaces.

8. The process of claim 1 or 2 in which the waste gas is discharged through a line maintained at a temperature above the melting point of trioxane.

9. The process of claim 8 in which the line is maintained at a temperature of 70° C. to 100° C.

* * * * *